(12) United States Patent
Falk

(10) Patent No.: US 7,259,768 B2
(45) Date of Patent: *Aug. 21, 2007

(54) METHODS AND APPARATUS FOR CONVERTING COLOR VALUES

(75) Inventor: Richard Falk, San Mateo, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/223,656

(22) Filed: Sep. 9, 2005

(65) Prior Publication Data

US 2006/0007241 A1 Jan. 12, 2006

Related U.S. Application Data

(63) Continuation of application No. 10/897,958, filed on Jul. 23, 2004, now Pat. No. 6,950,110, which is a continuation of application No. 10/154,643, filed on May 24, 2002, now Pat. No. 6,781,596.

(51) Int. Cl.
G09G 5/02 (2006.01)

(52) U.S. Cl. ............ 345/589; 345/600; 345/601; 345/602

(58) Field of Classification Search ........ 345/589, 345/600, 601, 602
See application file for complete search history.

(56) References Cited

U.S. PATENT DOCUMENTS

| | | | |
|---|---|---|---|
| 4,275,413 | A | 6/1981 | Sakamoto et al. |
| 5,390,035 | A | 2/1995 | Kasson et al. |
| 5,504,821 | A | 4/1996 | Kanamori et al. |
| 5,930,388 | A | 7/1999 | Murakami et al. |
| 6,195,456 | B1 | 2/2001 | Balasubramanian |
| 6,285,398 | B1 | 9/2001 | Shinsky et al. |
| 6,335,800 | B1 | 1/2002 | Balasubramanian |
| 6,556,312 | B1 | 4/2003 | Nagatani |

*Primary Examiner*—Matthew C Bella
*Assistant Examiner*—Mike Rahmjoo
(74) *Attorney, Agent, or Firm*—James Trosino

(57) ABSTRACT

Color conversion apparatus and methods are provided for converting a first color value, such as an RGB, L*a*b* or XYZ color value, to a second color value, such as an RGB, CMY, CMKY, L*a*b*, L, $C_1C_2$, or XYZ color value, without saturation error.

28 Claims, 5 Drawing Sheets

| 40 | 42 | 44 | 46 | 48 |
|----|----|----|----|----|
| 25 | 15 | 5  | 0  | 0  |

METHODS AND APPARATUS FOR CONVERTING COLOR VALUES

REFERENCE TO RELATED APPLICATIONS

This application is a continuation of U.S. application Ser. No. 10/897,958, filed 23 Jul. 2004, now U.S. Pat. No. 6,950,110, which is a continuation of U.S. application Ser. No. 10/154,643, filed 24 May 2002, now U.S. Pat. No. 6,781,596.

FIELD OF THE INVENTION

The present invention relates to methods and apparatus for converting color values. More particularly, this invention relates to methods and apparatus for converting color values using a color lookup table as may be used in a print output device, such as a copier, printer, facsimile, or other suitable device.

BACKGROUND OF THE INVENTION

A color image often is composed of an array of pixels, with each pixel including multiple color components. For example, in a three-color system, an electronic scanner may be used to separate a color image into red, green and blue ("RGB") color components, with each color component represented numerically. Thus, in an 8-bit, three color system, each pixel may be represented by three color values, with each color value being a number in the range between 0 and 255. For example, the color values of a pixel in an 8-bit RGB system may be expressed as (20, 77, 201), where the numbers 20, 77 and 201 represent the values of the red, green and blue components, respectively, for that pixel.

Color output devices, such as color printers, typically produce output images using cyan, magenta, yellow, and sometimes black colorants. Accordingly, color output devices typically represent images using cyan, magenta and yellow ("CMY") color components (i.e., a three color system), or cyan, magenta, yellow and black ("CMYK") color components (i.e., a four-color system). To reproduce a color image on a color output device, therefore, the image data typically must be converted from one color component system (e.g., RGB) to another system (e.g., CMY). In particular, the input color values of each pixel must be converted to respective output color values to accurately reproduce the image on a print medium. For example, an input pixel having RGB values of (20, 77, 201) may correspond to an output pixel having CMY values of (100, 82, 0).

More generally, it is often desirable to convert color values from a first color system to a second color system. One known method for converting color values uses a lookup table that provides a corresponding set of second color values for each set of first color values. In an 8-bit system, each first color component may have any value between 0 and 255. Thus, in a three-color system, each pixel may be represented by any one of over 16 million different combinations of first color values ($256^3$=16,777,216). Due to memory constraints, however, it is impractical for each of the possible combinations of first color values to be listed in the lookup table. Instead, a "sparse" lookup table is created that includes regularly spaced or intermittent combinations of first color values. For example, if a three-dimensional lookup table includes only thirty-three entries per dimension the lookup table will have 35,937 entries ($33^3$), which may be practically implemented in computer memory.

Referring to FIG. 1, each component of the first color value, for example, red, green or blue, can be visualized as corresponding to a respective axis in three dimensional space 10. A sparse lookup table can be visualized as including multiple points within three dimensional space 10. For example, point 20 may correspond to first color value (192, 168, 232), point 22 may correspond to first color value (200, 168, 232), point 24 may correspond to first color value (200, 168, 224), point 26 may correspond to first color value (192, 168, 224), point 28 may correspond to first color value (192, 160, 224), point 30 may correspond to first color value (192, 160, 232), point 32 may correspond to first color value (200, 160, 232) and point 34 may correspond to first color value (200, 160, 224).

For each point in the lookup table, there is also an associated second color value. Thus, point 20 may correspond to second color value (28, 36, 0), point 22 may correspond to second color value (25, 38, 0), point 24 may correspond to second color value (24, 37, 0), point 26 may correspond to second color value (27, 36, 0), point 28 may correspond to second color value (28, 41, 0), point 30 may correspond to second color value (29, 42, 0), point 32 may correspond to second color value (27, 42, 0) and point 34 may correspond to second color value (25, 42, 0).

Because a sparse lookup table includes only a subset of all possible first color combinations, many first color values will map to a point within this three dimensional space that does not correspond to one of the lookup table entries. For example, point 36 in FIG. 1 depicts a first color value that does not correspond to any entry in the lookup table. Instead, point 36 is surrounded by the eight entries corresponding to points 20, 22, 24, 26, 28, 30, 32 and 34.

One conventional technique for assigning second color values to the set of first color values represented by point 36 is to interpolate between the known second color values associated with the surrounding lookup table entries. More particularly, interpolation is performed between the second color values that correspond to some or all of the eight first color values that define the surrounding cube. Examples of such commonly known interpolation techniques are trilinear (e.g., as described in Kasson et al. U.S. Pat. No. 5,390,035), tetrahedral (e.g., as described in Sakamoto et al. U.S. Pat. No. 4,275,413), cubic (e.g., as described in Murakami et al. U.S. Pat. No. 5,930,388 ("Murakami")), prism (e.g., as described in Murakami), and other suitable interpolation techniques.

One problem with previously known interpolation techniques occurs when one of the second color values saturates at the low end (e.g., output value of 0) or high end (e.g., output value of 255) of the color value scale. An example of this "saturation error" is depicted in FIG. 2, which shows an array corresponding to a portion of a single dimension of the lookup table of FIG. 1. In particular, FIG. 2 illustrates an array having first color values at points 40, 42, 44, 46 and 48. In general, each point in the lookup table is associated with multiple second color components (e.g., three second color components such as in a CMY color space). For simplicity, only a single second color value is shown associated with each point in FIG. 2. Thus, points 40, 42, 44, 46 and 48 have associated second color values 25, 15, 5, 0 and 0, respectively.

Point 50 depicts a first color value that does not correspond to any entry in the lookup table, but instead is located halfway between points 44 and 46. Conventional linear interpolation techniques produce a second color value of ((5+0)÷2)=2.5 associated with point 50. However, this result is incorrect. In particular, assuming that the distance between second color components associated with points 42 and 44 (15−5=10 units) equals the distance between second color components associated with points 44 and 46, and assuming linearity in this region, the second color component associated with point 46 should have a value of −5. Because color component values are typically represented as unsigned numbers, however, the −5 value typically is clipped to 0. If the second color component value of point 46 were not so clipped, however, linear interpolation would produce a correct value of ((5+(−5))÷2)=0 for the second color component associated with point 50.

Although not shown in FIG. 2, the same saturation problem occurs at the other end of the color value scale. In particular, conventional linear interpolation techniques produce erroneous values when a second color component saturates at the high end of the color scale (e.g., 255 for an 8-bit color system). One consequence of the saturation-value interpolation error is that color components that should have 0 values actually contain non-zero values, and therefore look "dirty." This effect is most apparent with a light color component (e.g., light yellow) because any contamination of the color components is readily noticeable. The effect at the high end of the color scale also produces erroneous results.

The errors described above occur regardless of the type of linear interpolation used, the number of dimensions of the lookup table, or the number of bits used to represent color component values. Thus, in a 16-bit system used to covert RGB to CMYK data, in which color components may have any value between 0 and 65,535, the same type of interpolation error occurs when any of the four second color component values saturate at the low end (i.e., 0) or the high end (i.e., 65,535) of the color scale.

In view of the foregoing, it would be desirable to provide methods and apparatus for converting a first color value to a second color value without saturation error.

SUMMARY OF THE INVENTION

In view of the foregoing, it is an object of this invention to provide methods and apparatus for converting a first color value to a second color value without saturation error. These and other objects of the present invention are accomplished by providing methods and apparatus for converting a first color value, such as an RGB, L*a*b* or XYZ, etc. color value, to a second color value, such as an RGB, CMY, CMKY, L*a*b*, $L,C_1C_2$, or XYZ color value, via an intermediate color space. Apparatus according to this invention include computer hardware and/or software that may be programmed or provided that perform methods in accordance with this invention.

Methods according to this invention include providing an uncompressed lookup table having a plurality of table entries, with each table entry associating one of a first color value with one of a second color value. Each of the first and second color values have a value between zero ("ZERO") and a non-zero maximum value ("MAX"). Next, second color values are compressed to form intermediate color values. Certain intermediate color values then are reset to a value determined by a regression that includes adjacent intermediate color values. To convert a first color value to a second color value, the compressed and modified table is used to convert the first color value to an intermediate color value, and then a decompressor is used to convert the intermediate color value to the second color value.

BRIEF DESCRIPTION OF THE DRAWINGS

The above-mentioned objects and features of this invention can be more clearly understood from the following detailed description considered in conjunction with the following drawings, in which the same reference numerals denote the same structural elements throughout, and in which.

DETAILED DESCRIPTION OF THE INVENTION

This invention provides methods and apparatus for converting a first color value, such as an RGB, L*a*b* or XYZ, or other color value, to a second color value, such as RGB, CMY, CMKY, L*a*b*, $L,C_1C_2$, XYZ, or other color value. Methods in accordance with this invention may be implemented in the form of computer-executable instructions, such as software modules, that may be executed by a computer device. Such software modules may include routines, programs, objects, components, data structures, etc. that perform tasks or implement particular abstract data types. Persons of ordinary skill in the art will understand that at least some aspects of this invention may be practiced using personal computers, microprocessor-based computers, multiprocessor systems, network computers, servers, minicomputers, set top boxes, mainframe computers, and other suitable computer systems. In addition, at least some aspects of this invention may be practiced in distributed computing environments in which task are performed by remote processing devices linked via a communications network.

Figure 1:
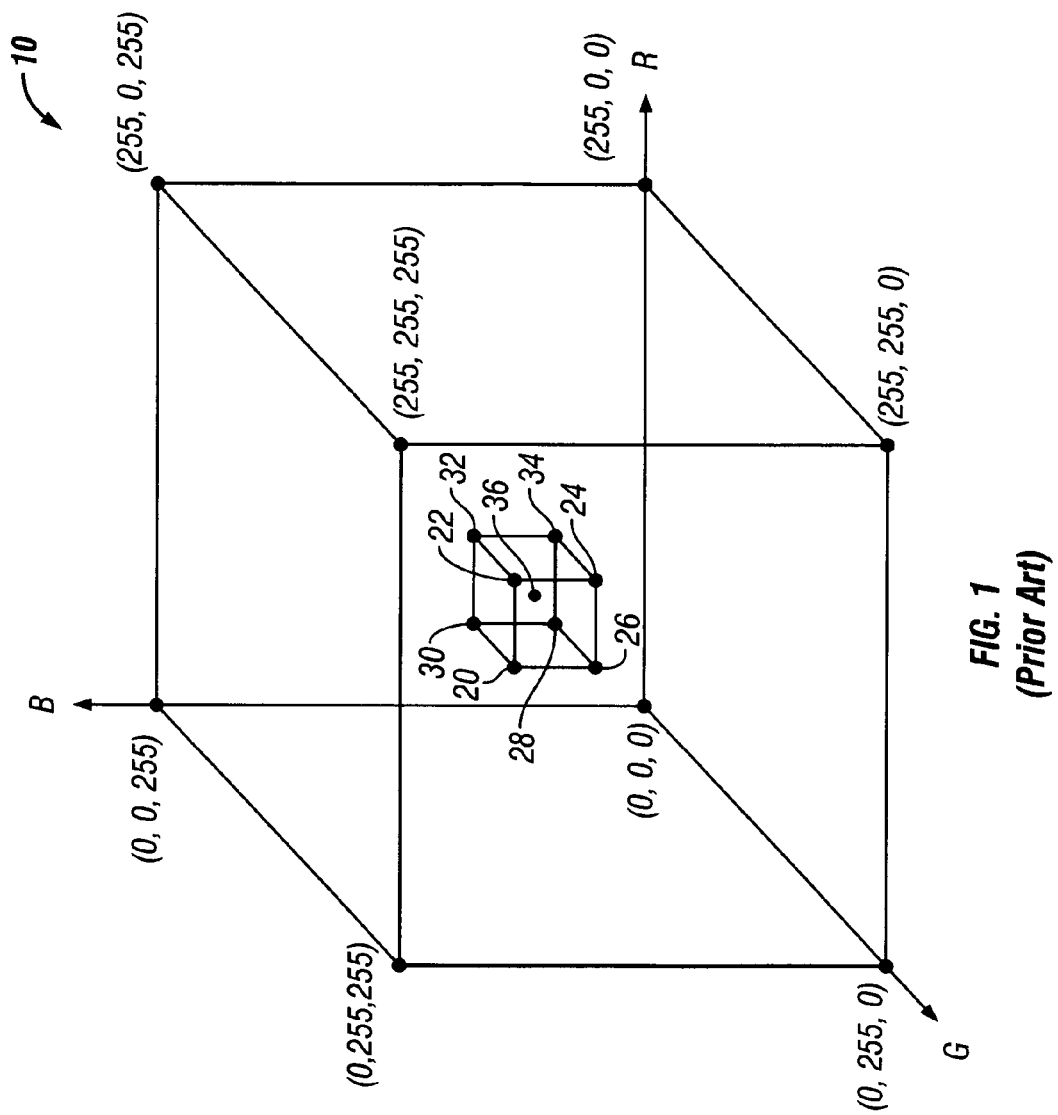
FIG. 1 is a schematic diagram of color value entries of a previously known look-up table used to convert a first color value to a second color value.
Figures 2, 3:
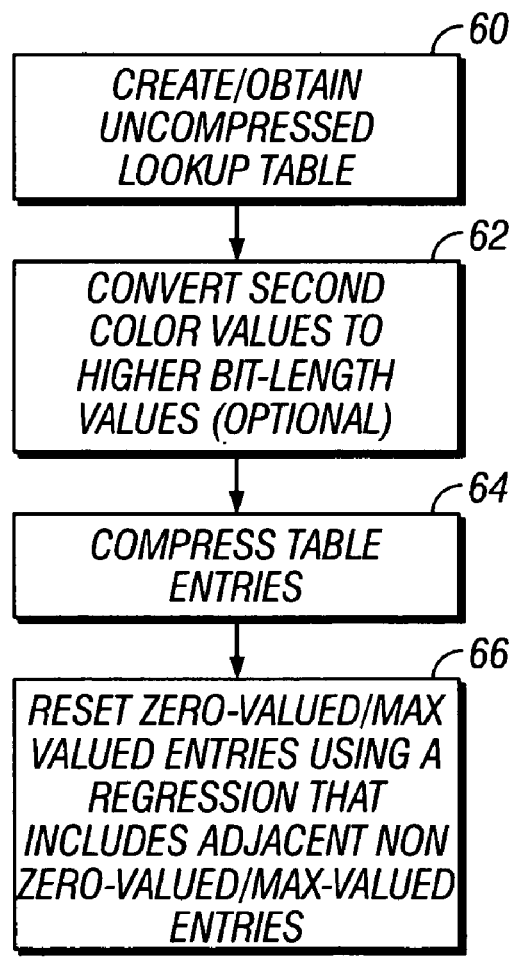
FIG. 2 is schematic diagram illustrating a subset of color value entries of the table of FIG. 1.
FIG. 3 is a schematic block diagram of an exemplary method for creating compressed color conversion tables in accordance with this invention.

FIG. 3 illustrates an exemplary method for creating lookup tables in accordance with this invention. At step 60, an uncompressed lookup table is created or obtained for converting a first color value to a second color value. Persons of ordinary skill in the art will understand that the uncompressed lookup table may be created or obtained in any of a number of well-known ways. For example, the lookup table may be created by calculating color response functions to map colors in a first color system to colors in a second color system. Alternatively, the lookup table may be created by describing a relationship between a source device profile and a destination device profile, in which the device profiles describe mappings from device-dependent color coordinate systems to device-independent color coordinate systems. The entries or "nodes" in the lookup table may be evenly dispersed along each axis in the table, or may be irregularly dispersed along the various axes (e.g., as described in Balasubramanian U.S. Pat. No. 6,335,800). The array of FIG. 2 is a portion of an exemplary lookup table that may be used in accordance with this invention.

Referring again to FIG. 3, methods in accordance with this invention optionally may next include step 62, in which second color values in the uncompressed lookup table are converted to higher bit-length values. For example, if the lookup table includes 8-bit second color values, at step 62 the second color values may be converted to 16-bit values in accordance with commonly known conversion techniques. The purpose of this step is to minimize quantization errors that may occur in the subsequent compression step.

At step 64, the second color values for entries in the uncompressed lookup table are compressed to form intermediate color values. One suitable form of compression is linear compression, such as provided in the following formula:

$$y = \alpha x + \beta \quad (1)$$

where $\alpha$ is a scale factor, x is a second color value, $\beta$ is a constant, and y is the intermediate color value. In an 8-bit color system, in which MAX=255, the following values may be used:

$$\alpha = 0.6$$

$$\beta = 64 \quad (2)$$

The exemplary values for $\alpha$ and $\beta$ specified in Equation (2) provide a compression factor of approximately 2:1, and also convert ZERO and MAX to integer values. In a 16-bit color system, in which MAX=65,535, the following values may be used: $\alpha=0.6$ and $\beta=13,107$. Note that the values selected for $\alpha$ and $\beta$ may differ from the exemplary values specified above, and may be selected such that the intermediate color values have a desired characteristic, as described below. In addition, the compression formula of Equations (1) and (2) may be predetermined, or may be dynamically determined based on specific characteristics (e.g., magnitude, dynamic range) of the second color values.

In step 64, a compressed table containing intermediate color values is created by applying the compression formula of Equations (1) and (2) to the second color values of the uncompressed table. As used herein, a table entry having a second color value equal to ZERO is referred to as a "Zero-Valued Entry" and an entry having a second color value equal to MAX is referred to as a "Max-Valued Entry." To simplify subsequent processing steps, all table entries except Zero-Valued Entries and Max-Valued Entries may be compressed, and the intermediate color values of Zero-Valued Entries and Max-Valued Entries, may be set to ZERO and MAX, respectively.

Figure 4:
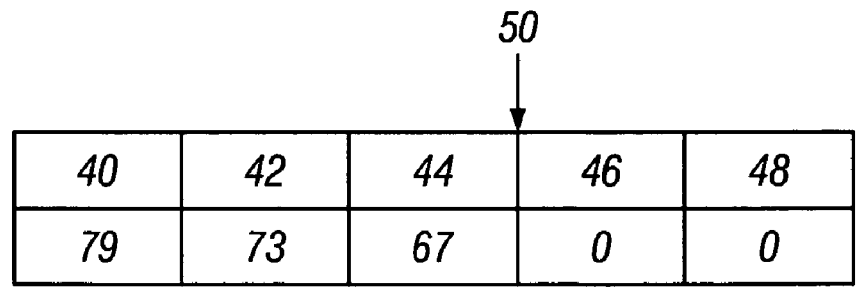
FIG. 4 is a schematic diagram illustrating an exemplary compression of second color values in accordance with this invention.

An example of this compression technique is illustrated in FIG. 4, which shows compressed table entries determined based on the uncompressed table entries from FIG. 2. As shown in FIG. 4, the intermediate color values of entries 40, 42 and 44 equal 79, 73 and 67, respectively, based on the compression formula of Equations (1) and (2). Entries 46 and 48 are Zero-Valued Entries, and accordingly have intermediate color values equal to ZERO.

Figure 5:
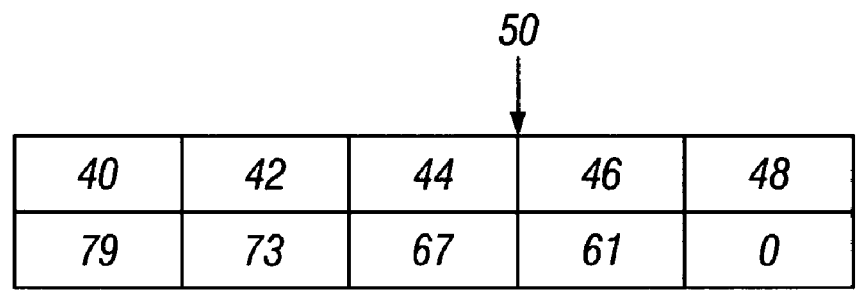
FIG. 5 is a schematic diagram illustrating a first iteration of an exemplary regression of intermediate color values in accordance with this invention.
Figure 6:
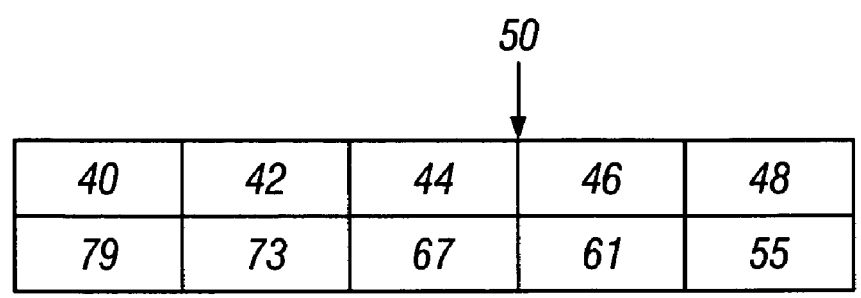
FIG. 6 is a schematic diagram illustrating a second iteration of an exemplary regression of intermediate color values in accordance with this invention.

Referring again to FIG. 3, at step 66, the intermediate color values of Zero-Valued Entries are reset to a value determined by a regression, such as linear extrapolation or higher-order regression, that includes table entries having intermediate color values greater than ZERO. This step may be implemented in an iterative fashion, beginning with a Zero-Valued Entry adjacent an entry having a non-ZERO intermediate color value, and resetting the intermediate color value of each Zero-Valued Entry until the intermediate color values of all Zero-Valued Entries have been reset. Thus, as shown in FIG. 4, this iterative process would begin with Zero-Valued Entry 46, which is adjacent entry 44 having an intermediate color value (67) greater than ZERO. FIGS. 5 and 6 illustrate such an iterative approach using linear extrapolation implemented along a single dimension of the compressed lookup table.

As shown in FIG. 5, the intermediate color value of entry 46 has been reset from 0 to 61. To determine this result, linear extrapolation is performed based on the intermediate color values associated with points 42 and 44. That is, the difference in intermediate color values associated with points 42 and 44 (73−66=6) is extrapolated to provide a new intermediate color value of (67−6=61) for entry 46.

The result of the next step in the iteration is shown in FIG. 6. In particular, the intermediate color value of entry 48 has been reset from 0 to 55. To determine this result, linear extrapolation is performed based on the intermediate color values associated with points 44 and 46. That is, the difference in intermediate color values associated with points 44 and 46 (67−61=6) is extrapolated to provide an intermediate color value of (61−6=55) for entry 48. This iterative process may continue until all Zero-Valued Entries are reset. Note that other higher-order regression methods using additional table entries may be used to determine the reset value of the Zero Valued Entries. However, table entries having ZERO-valued intermediate color values should not be included in any regression because such values may not be "correct" (i.e., they are saturated values).

Similarly, intermediate color values of Max-Valued Entries are reset to a value determined by a regression that includes table entries having intermediate color values less than MAX. This step also may be implemented in an iterative fashion, beginning with a Max-Valued Entry adjacent an entry having a non-MAX intermediate color value, and resetting the intermediate color value of each Max-Valued Entry until the intermediate color values of all Max-Valued Entries have been reset.

Figure 7:
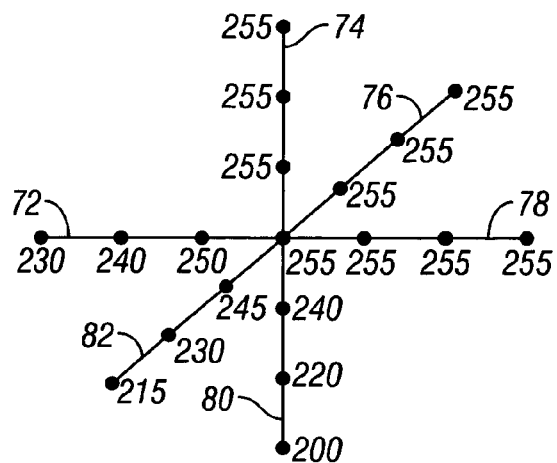
FIG. 7 is a schematic diagram of a portion of an uncompressed multi-dimensional color table for use with methods in accordance with this invention.
Figure 8:
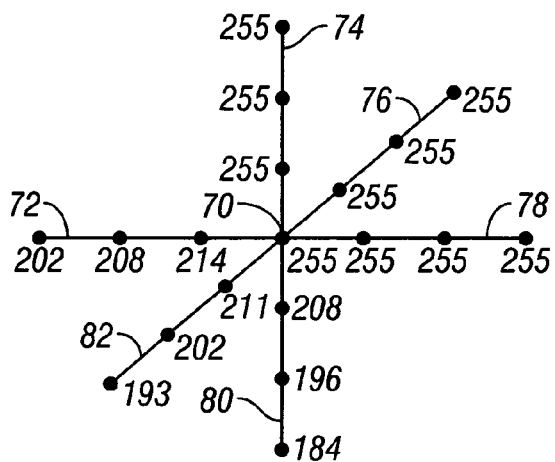
FIG. 8 is a schematic diagram of the multi-dimensional color table of FIG. 7 following an exemplary compression in accordance with this invention.
Figure 9:
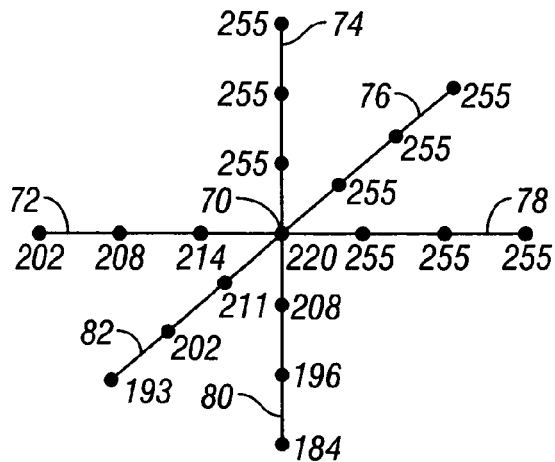
FIG. 9 is a schematic diagram of the multi-dimensional color table of FIG. 8 after an exemplary multi-dimensional regression in accordance with this invention.

The exemplary technique described above and illustrated in FIGS. 5 and 6 show linear extrapolation along a single dimension of the compressed lookup table. In general, however, the compressed lookup table will be a multi-dimensional table, and each Zero-Valued Entry and Max-Valued Entry will have adjacent table entries along multiple dimensions. FIGS. 7-9 illustrate exemplary methods in accordance with this invention applied along multiple dimensions of a multi-dimensional lookup table. In particular, FIG. 7 shows a portion of an uncompressed lookup table that includes entries along segments 72, 74, 76, 78, 80, and 82. Segment 72 has entries that include second color values 230, 240 and 250; segments 74, 76 and 78 each have entries that include second color values that are saturated at 255, 255 and 255; segment 80 has entries that include second color values 200, 220 and 240; and segment 82 has entries that include second color values 215, 230 and 245.

FIG. 8 shows the results of applying the compression technique described above in connection with step 64 in FIG. 3, to the table entries of FIG. 7. Using the exemplary compression formula of Equations (1) and (2), the intermediate color values of the entries are: 202, 208 and 214 along segment 72; 184, 196 and 208 along segment 80; and 193, 202 and 211 along segment 82. The entries along segments 74, 76 and 78 all are MAX-Valued Entries, and accordingly have intermediate color values equal to MAX.

As shown in FIG. 8, Max-Valued Entry 70 is adjacent to multiple table entries having intermediate color values less than MAX. In accordance with this invention, the reset value for Max-Valued Entry 70 may be determined by performing a regression that includes intermediate color values along any or all of segments 72, 80 and 82. For example, linear extrapolation of intermediate color values may be performed along each of segments 72, 80 and 82, and the highest (or lowest) result may be used for the reset value of entry 70. Alternatively, the average of the extrapolation results may be used as the reset value for entry 70.

FIG. 9 illustrates the result of linear extrapolation of intermediate color values along segments 72, 80 and 82 to provide a reset value of 220 for entry 70. As can be seen, the result of linear extrapolation along each of the selected segments produces the same result. Persons of ordinary skill in the art will understand that if the region in which extrapolation is performed is linear, then the extrapolation result from all non-ZERO (or non-MAX) directions is identical. Once the reset value of entry 70 is calculated, the reset value of other Max-Valued Entries and Zero-Valued Entries may be determined in the same manner described above.

Figure 10:
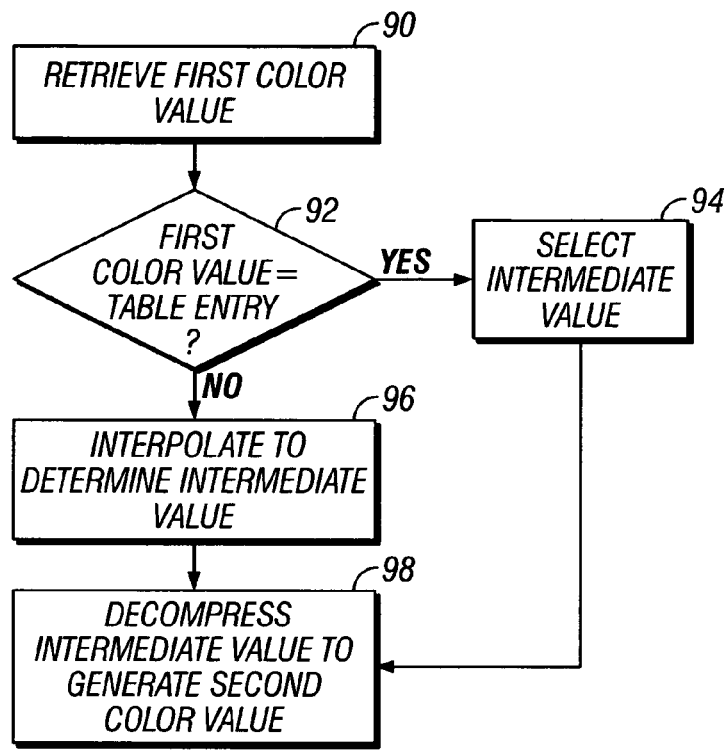
FIG. 10 is a schematic block diagram of an exemplary method for converting first color values to second color values in accordance with this invention.

After the compressed and modified table is created, it then may be used to convert first colors values to intermediate color values that may subsequently be decompressed to provide second color values. FIG. 10 illustrates an exemplary process for converting first color values to second color values in accordance with this invention. At step 90, a first color value is retrieved. At step 92, the compressed and modified table is evaluated to determine if the first color value is an entry or node in the table. If so, at step 94, the intermediate color value associated with the table entry is selected. If, however, the first color value corresponds to a point between adjacent table entries, linear interpolation is performed in step 96 to determine the intermediate color value associated with the first color value. Next, at step 78, the selected or interpolated intermediate color value is decompressed using an inverse of the compression formula. The result is the second color value.

Using the compressed and modified table values shown in FIG. 6, the second color value may be determined for the following two examples, in which the retrieved first color value at step 90 is: (1) a first color value corresponding to point 42; and (2) a first color value corresponding to point 50 midway between points 44 and 46. In the first example, at step 92, because point 42 is a node in the table, the result of the decision block is "YES." Accordingly, at step 94, the intermediate color value of 73 is selected. Proceeding to step 98, the second color value is determined by decompressing the intermediate color value using the inverse of the formula used to compress the table entries. For the exemplary compression formula specified in Equation (1), the corresponding decompression formula is:

$$z = (1 \div \alpha) \times (y - \beta) \quad (3)$$

where y is the intermediate color value and z is the resulting second color value. Using the values for $\alpha$ and $\beta$ specified in Equation (2), and the intermediate color value y=73, Equation (3) provides a second color value z=(1÷0.6)×(73−64)=15. This result is the same as the second color value associated with point 42 in FIG. 2.

In the second example, first color value 50 midway between points 44 and 46 is not a table entry. Thus, at step 92, the result of the decision block is "NO." Accordingly, at step 96, the intermediate color value is determined by interpolation. As discussed above, any previously known interpolation technique may be used. By way of example, using linear interpolation, the intermediate color value y midway between points 44 and 46 equals ((67+61)÷2)=64. At step 98, Equations (2) and (3) provide a second color value z=(1÷0.5)(64−64)=0, which is the correct result. Note that the second color value z typically will saturate to ZERO if the result of Equation (3) is a value less than 0, and will saturate to 255 (in an 8-bit color system) or 65,535 (in a 16-bit color system) if the result of Equation (3) is a value that exceeds 255 or 65,535, respectively.

Methods in accordance with this invention can be repeated for each pixel in the image that is to be converted. In the examples above, three color components are included in each image pixel. However, methods in accordance with this invention can be used with pixels having a number of color components other than three. Moreover, the color components of the image pixel can be converted to RGB, CMY, CMKY, L*a*b*, L,$C_1C_2$, XYZ, or other color value.

Figure 11:
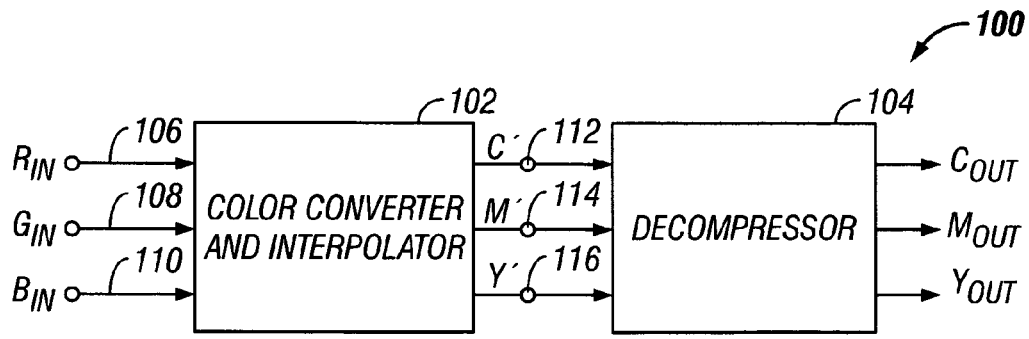
FIG. 11 is a schematic block diagram of an exemplary system for converting first color values to second color values in accordance with this invention.

Referring now to FIG. 11, an exemplary color conversion system in accordance with this invention is described. Color conversion system 100 includes color converter and interpolator 102 and decompressor 104. Color converter and interpolator 102 has multiple inputs 106, 108 and 110 for receiving first color values $R_{IN}$, $G_{IN}$ and $B_{IN}$, respectively, and provides intermediate color values C', M' and Y'. Color converter and interpolator 102 converts first color values $R_{IN}$, $G_{IN}$ and $B_{IN}$ to intermediate color values C', M' and Y' using a compressed and modified color table created as described above in connection with FIG. 3. The compressed and modified color table may be a sparse table having a subset of the total number of possible first color values $R_{IN}$, $G_{IN}$ and $B_{IN}$. Accordingly, color converter and interpolator 102 also performs interpolation to provide intermediate color values C', M' and Y' for first color values $R_{IN}$, $G_{IN}$ and $B_{IN}$ that do not correspond to entries of the compressed and modified color table. Decompressor 104 has multiple inputs 112, 114 and 116 for receiving intermediate color values C', M' and Y', respectively, and provides second color values $C_{OUT}$, $M_{OUT}$ and $Y_{OUT}$ in accordance with methods described above in connection with FIG. 10.

Persons of ordinary skill in the art will understand that color converter and interpolator 102 and decompressor 104 each may be implemented in hardware or software, or any combination of hardware and software in accordance with well-known techniques. Persons of ordinary skill in the art also will understand that the first color values coupled to color converter and interpolator 102 may be RGB, L*a*b* or XYZ, or other color values, and the second color values provided by decompressor 104 may be RGB, CMY, CMKY, L*a*b*, L,$C_1C_2$, XYZ, or any other output color values.

Figure 12:
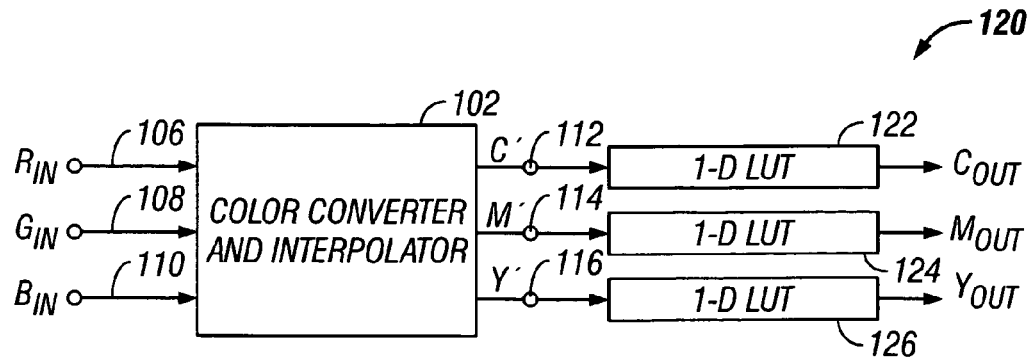
FIG. 12 is a schematic block diagram of another exemplary system for converting first color values to second color values in accordance with this invention.

Referring now to FIG. 12, an alternative color converter system in accordance this invention is described. Color conversion system 120 includes color converter and interpolator 102 and one-dimensional lookup table ("1-D LUT") modules 122, 124 and 126. Each 1-D LUT module may be used to decompress a single color channel in accordance with methods described above in connection with FIG. 10. Thus, as shown in FIG. 12, 1-D LUT 122 decompresses the "C" channel, 1-D LUT 124 decompresses the "M" channel, and 1-D LUT 126 decompresses the "Y" channel. Persons of ordinary skill in the art will understand that additional 1-D LUT modules may be added to decompress additional color channels. Persons of ordinary skill in the art also will understand that each 1-D LUT module may be implemented in hardware or software, or any combination of hardware and software in accordance with well-known techniques.

The number of entries in each of 1-D LUT modules 122, 124 and 126 may exceed the number of entries in each dimension of the compressed and modified color table in color converter and interpolator 102. For greatest accuracy, the compression constants α and β of Equation (1) and the number of entries in each 1-D LUT should be selected so that each 1-D LUT includes entries for intermediate color values corresponding to ZERO and MAX valued second color values.

Methods in accordance with this invention have been described herein as applying to the conversion of color values from one color space to another, such as from RGB to CMY. Persons of ordinary skill in the art will understand, however, that methods in accordance with this invention also can be applied to conversions within a single color space such as RGB to RGB. Moreover, methods in accordance with this invention also can be applied to conversions of other sets of quantified image qualities such as, for example, L*a*b* and XYZ color spaces.

Exemplary apparatus for implementing at least some aspects of this invention include a general purpose computing device, such as a personal computer, and a special purpose computing device, such as a controller for digital printers and digital copiers. Such computing devices may include a computer memory such as read only memory, hard disk, magnetic disk, optical disk, or other suitable memory that may be used to store software modules and other data, such as lookup tables, used to implement methods of the present invention.

Persons of ordinary skill in the art further will recognize that methods and apparatus in accordance with this invention may be implemented using steps or devices other than those shown and discussed above. All such modifications are within the scope of the present invention, which is limited only by the claims that follow.

What is claimed is:

1. A color conversion system comprising:
a color converter comprising a plurality of inputs for receiving first color values, and a plurality of outputs for providing intermediate color values, the color converter comprising a modified color conversion lookup table that is created by:
receiving a color conversion lookup table that includes a plurality of table entries, each entry associating a corresponding first value to a corresponding second value;
identifying a minimum value of the plurality of corresponding second values;
identifying table entries that have corresponding second values equal to the minimum value, and that are adjacent an entry having a corresponding second value greater than the minimum value;
compressing the corresponding second value of each of the table entries to form corresponding intermediate values; and
replacing the corresponding intermediate value of each of the identified entries with a value determined by a regression that includes the corresponding intermediate value of the corresponding adjacent entry.

2. The system of claim 1, wherein each of the corresponding second values has a first bit-length, and the method further comprises converting the corresponding second values to values having a second bit length.

3. The system of claim 2, wherein the second bit length is greater than the first bit length.

4. The system of claim 1, wherein compressing comprises linearly compressing the corresponding second value of each of the table entries.

5. The system of claim 1, wherein compressing comprises multiplying the corresponding second value of each of the table entries by a scale factor.

6. The system of claim 1, wherein compressing comprises adding a constant value to the corresponding second value of each of the table entries.

7. The system of claim 1, wherein the regression comprises linear extrapolation.

8. A color conversion system comprising:
a color converter comprising a plurality of inputs for receiving first color values, and a plurality of outputs for providing intermediate color values, the color converter comprising a modified color conversion lookup table that is created by:
receiving a color conversion lookup table that includes a plurality of table entries, each entry associating a corresponding first value to a corresponding second value;
identifying a maximum value of the plurality of corresponding second values;
identifying table entries that have corresponding second values equal to the maximum value, and that are adjacent an entry having a corresponding second value less than the maximum value;
compressing the corresponding second value of each of the table entries to form corresponding intermediate values; and
replacing the corresponding intermediate value of each of the identified entries with a value determined by a regression that includes the corresponding intermediate value of the corresponding adjacent entry.

9. The system of claim 8, wherein each of the corresponding second values has a first bit-length, and the method further comprises converting the corresponding second values to values having a second bit length.

10. The system of claim 9, wherein the second bit length is greater than the first bit length.

11. The system of claim 8, wherein compressing comprises linearly compressing the corresponding second value of each of the table entries.

12. The system of claim 8, wherein compressing comprises multiplying the corresponding second value of each of the table entries by a scale factor.

13. The system of claim 8, wherein compressing comprises adding a constant value to the corresponding second value of each of the table entries.

14. The system of claim 8, wherein the regression comprises linear extrapolation.

15. A computer readable medium comprising computer program instructions structured to cause a computer to modify a color conversion lookup table that includes a plurality of table entries, each entry associating a corresponding first value to a corresponding second value, the instructions causing the machine to:

identify a minimum value of the plurality of corresponding second values;

identify table entries that have corresponding second values equal to the minimum value, and that are adjacent an entry having a corresponding second value greater than the minimum value;

compress the corresponding second value of each of the table entries to form corresponding intermediate values; and replace the corresponding intermediate value of each of the identified entries with a value determined by a regression that includes the corresponding intermediate value of the corresponding adjacent entry.

16. The computer readable medium of claim 15, wherein each of the corresponding second values has a first bit-length, and the instructions further cause the machine to convert the corresponding second values to values having a second bit length.

17. The computer readable medium of claim 16, wherein the second bit length is greater than the first bit length.

18. The computer readable medium of claim 15, wherein the instructions further cause the machine to linearly compress the corresponding second value of each of the table entries.

19. The computer readable medium of claim 15, wherein the instructions further cause the machine to multiply the corresponding second value of each of the table entries by a scale factor.

20. The computer readable medium of claim 15, wherein the instructions further cause the machine to add a constant value to the corresponding second value of each of the table entries.

21. The computer readable medium of claim 15, wherein the regression comprises linear extrapolation.

22. A computer readable medium comprising computer program instructions structured to cause a computer to modify a color conversion lookup table that includes a plurality of table entries, each entry associating a corresponding first value to a corresponding second value, the instructions causing the machine to:

identify maximum value of the plurality of corresponding second values;

identify table entries that have corresponding second values equal to the maximum value, and that are adjacent an entry having a corresponding second value less than the maximum value;

compress the corresponding second value of each of the table entries to form corresponding intermediate values; and replace the corresponding intermediate value of each of the identified entries with a value determined by a regression that includes the corresponding intermediate value of the corresponding adjacent entry.

23. The computer readable medium of claim 22, wherein each of the corresponding second values has a first bit-length, and the instructions further cause the machine to convert the corresponding second values to values having a second bit length.

24. The computer readable medium of claim 23, wherein the second bit length is greater than the first bit length.

25. The computer readable medium of claim 22, wherein the instructions further cause the machine to linearly compress the corresponding second value of each of the table entries.

26. The computer readable medium of claim 22, wherein the instructions further cause the machine to multiply the corresponding second value of each of the table entries by a scale factor.

27. The computer readable medium of claim 22, wherein the instructions further cause the machine to add a constant value to the corresponding second value of each of the table entries.

28. The computer readable medium of claim 22, wherein the regression comprises linear extrapolation.

* * * * *